(12) United States Patent
Patel et al.

(10) Patent No.: US 12,013,853 B2
(45) Date of Patent: Jun. 18, 2024

(54) CLOUD BASED QUERY WORKLOAD OPTIMIZATION

(71) Applicant: Microsoft Technology Licensing, LLC, Redmond, WA (US)

(72) Inventors: Hiren S. Patel, Bothell, WA (US); Rathijit Sen, Madison, WI (US); Zhicheng Yin, Kirkland, WA (US); Shi Qiao, Bellevue, WA (US); Abhishek Roy, Bellevue, WA (US); Alekh Jindal, Sammamish, WA (US); Subramaniam Venkatraman Krishnan, Santa Clara, CA (US); Carlo Aldo Curino, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 72 days.

(21) Appl. No.: 16/581,905

(22) Filed: Sep. 25, 2019

(65) Prior Publication Data
US 2021/0089532 A1 Mar. 25, 2021

(51) Int. Cl.
*G06F 16/2453* (2019.01)
(52) U.S. Cl.
CPC .............. *G06F 16/24542* (2019.01)
(58) Field of Classification Search
None
See application file for complete search history.

(56) References Cited

U.S. PATENT DOCUMENTS

| | | | |
|---|---|---|---|
| 7,200,588 B1* | 4/2007 | Srivastava | G06F 11/3636 |
| 9,275,359 B1 | 3/2016 | Fomin et al. | |
| 11,436,213 B1* | 9/2022 | Waas | G06F 40/30 |
| 2003/0225768 A1* | 12/2003 | Chaudhuri | G06F 16/284 |
| 2005/0049999 A1* | 3/2005 | Birn | G06F 11/3636 |
| | | | 707/999.009 |
| 2007/0162439 A1* | 7/2007 | Petropoulos | G06F 16/951 |
| 2010/0082599 A1* | 4/2010 | Graefe | G06F 16/217 |
| | | | 707/713 |
| 2011/0154296 A1* | 6/2011 | Marenco | G06F 11/3636 |
| | | | 717/128 |

(Continued)

OTHER PUBLICATIONS

An adaptive prediction approach based on workload pattern discrimination in the cloud, Liu et al, Journal of Network and Computer Applications. (Year: 2016).*

(Continued)

*Primary Examiner* — Augustine K. Obisesan
(74) *Attorney, Agent, or Firm* — Holzer Patel Drennan

(57) ABSTRACT

The cloud-based query workload optimization system disclosed herein the cloud-based query workloads optimization system receives query logs from various query engines to a cloud data service, extracts various query entities from the query logs, parses query entities to generate a set of common workload features, generates intermediate representations of the query workloads, wherein the intermediate representations are agnostic to the language of the plurality of the queries, identifies a plurality of workload patterns based on the intermediate representations of the query workloads, categorizes the workloads in one or more workload type categories based on the workload patterns and the workload features, and selects an optimization scheme based on the category of workload pattern.

20 Claims, 8 Drawing Sheets

(56) References Cited

U.S. PATENT DOCUMENTS

| | | | | |
|---|---|---|---|---|
| 2015/0379013 | A1* | 12/2015 | Purcell | G06F 16/3329 |
| | | | | 707/755 |
| 2017/0132296 | A1* | 5/2017 | Ding | G06F 16/248 |
| 2018/0089268 | A1* | 3/2018 | Lee | G06F 16/24537 |
| 2019/0303509 | A1* | 10/2019 | Greene | G06F 16/9038 |
| 2020/0042647 | A1* | 2/2020 | Pandey | G06N 20/00 |
| 2020/0135264 | A1* | 4/2020 | Brady | G06F 3/0649 |
| 2020/0267216 | A1* | 8/2020 | Haggart | H04L 67/1097 |

OTHER PUBLICATIONS

Workload Optimization using SharedDB, Giannikis et al., SIGMOD'13, Jun. 22-27, 2013 (Year: 2013).*

Evolutionary Multiobjective Query Workload Optimization of Cloud Data Warehouses, Dokeroglu, Hindawi Publishing Corporation e Scientific World Journal vol. 2014, (Year: 2014).*

Workload-Based Optimization of Integration Processes, Boehm et al, CIKM'08, Oct. 26-30, 2008 (Year: 2008).*

Monitoring of Changing Query Workloads for Online Index Recommendations, Gibas et al. (Year: 2006).*

Miller, Justin J., "Graph Database Applications and Concepts with Neo4j", In Proceedings of the Southern Association for Information Systems Conference, Mar. 23, 2013, pp. 141-147.

Mitzenmacher, Michael, "A Model for Learned Bloom Filters and Related Structures", In repository of arXiv, arXiv:1802.00884v1, Feb. 3, 2018, 5 Pages.

Nykiel, et al., "MRShare: Sharing Across Multiple Queries in MapReduce", In Proceedings of the VLDB Endowment, vol. 3, Issue 1, Sep. 2010, pp. 494-505.

Ortiz, et al., "Learning State Representations for Query Optimization with Deep Reinforcement Learning", In Proceedings of the Second Workshop on Data Management for End-To-End Machine Learning, Article No. 4, Jun. 15, 2018, 4 Pages.

Pedregosa, et al., "Scikit-learn: Machine Learning in Python", In Journal of Machine Learning Research, vol. 12, Oct. 2011, pp. 2825-2830.

Rajan, et al., "PerfOrator: Eloquent Performance Models for Resource Optimization", In Proceedings of the Seventh ACM Symposium on Cloud Computing, Oct. 5, 2016, pp. 415-427.

Ramakrishnan, et al., "Azure Data Lake Store: A Hyperscale Distributed File Service for Big Data Analytics", In Proceedings of the ACM International Conference on Management of Data, May 14, 2017, pp. 51-63.

Rodríguez, et al., "Reuse-based Optimization for Pig Latin", In Proceedings of the 25th ACM International on Conference on Information and Knowledge Management, Oct. 24, 2016, pp. 2215-2220.

Vartak, et al., "ModelDB: A System for Machine Learning Model Management", In Proceedings of the Workshop on Human-In-the-Loop Data Analytics, Jun. 26, 2016, 3 Pages.

Vartak, et al., "SEEDB: Efficient Data-Driven Visualization Recommendations to Support Visual Analytics", In Proceedings of the VLDB Endowment, vol. 8, Issue 13, Sep. 2015, pp. 2182-2193.

Viswanathan, et al., "Query and Resource Optimization: Bridging the Gap", In Proceedings of IEEE 34th International Conference on Data Engineering, Apr. 16, 2018, pp. 1384-1387.

Wu, et al., "Towards a Learning Optimizer for Shared Clouds", In Proceedings of the VLDB Endowment, vol. 12, Issue 3, Nov. 2018, pp. 210-222.

Yang, et al., "Selectivity Estimation with Deep Likelihood Models", In repository of arXiv, arXiv:1905.04278v1, May 10. 2019, 14 Pages.

Mason, Andrew J., "OpenSolver—An Open Source Add-in to Solve Linear and Integer Progammes in Excel", In Operations Research Proceedings, Aug. 30, 2011, pp. 401-406.

"Amazon Athena", Retrieved From: http://web.archive.org/web/20190630215520/https://aws.amazon.com/athena/, Retrieved On: Jun. 30, 2019, 7 Pages.

"Apache Airflow Documentation", Retrieved From: http://web.archive.org/web/20190612161344/https://airflow.apache.org/, Retrieved On: Jun. 12, 2019, 11 Pages.

"Azure Data Explorer", Retrieved From: http://web.archive.org/web/20190706102844/https://azure.microsoft.com/en-us/services/data-explorer/, Retrieved On: Jul. 6, 2019, 11 Pages.

"Azure Data Lake Analytics", Retrieved From: http://web.archive.org/web/20190716173202/https://azure.microsoft.com/en-us/services/data-lake-analytics/, Retrieved On: Jul. 16, 2019, 7 Pages.

"Azure HDInsight", Retrieved From: http://web.archive.org/web/20190615020114/http://azure.microsoft.com/en-us/services/hdinsight/, Retrieved On: Jun. 15, 2019, 20 Pages.

"Azure Serverless Computing", Retrieved From: https://azure.microsoft.com/en-us/overview/serverless-computing/, Retrieved On: Aug. 2, 2019, 16 Pages.

"Azure SQL Database", Retrieved From: http://web.archive.org/web/20190615020108/http://azure.microsoft.com/en-us/services/sql-database/, Retrieved On: Jun. 15, 2019, 18 Pages.

"Celery: Distributed Task Queue", Retrieved From: http://web.archive.org/web/20190615120423/http://www.celeryproject.org/, Retrieved On: Jun. 15, 2019, 2 Pages.

"Cloud Databases: The Advantage of No More Performance Tuning", Retrieved From: http://web.archive.org/web/20190630104252/https://datometry.com/resources/cloud-express-articles/cloud-databases-advantages-no-more-performance-tuning/, Retrieved On: Jun. 30, 2019, 5 Pages.

"CPLEX Optimizer", Retrieved From: http://web.archive.org/web/20190502141258/https://www.ibm.com/analytics/cplex-optimizer, Retrieved On: May 2, 2019, 8 Pages.

"GCP Serverless Computing", Retrieved From: http://web.archive.org/web/20190703200255/https://cloud.google.com/serverless/, Retrieved On: Jul. 3, 2019, 9 Pages.

"Google BigQuery", Retrieved From: http://web.archive.org/web/20190628010819/https://cloud.google.com/bigquery/, Retrieved On: Jun. 28, 2019, 24 Pages.

"Gurobi Optimization", Retrieved From: http://web.archive.org/web/20190618193346/http://www.gurobi.com/, Retrieved On: Jun. 18, 2019, 1 Page.

"Keras: The Python Deep Learning Library", Retrieved From: http://web.archive.org/web/20190609195838/https://keras.io/, Retrieved On: Jun. 9, 2019, 5 Pages.

"ML.NET", Retrieved From: http:/web.archive.org/web/20190614161559/https://dotnet.microsoft.com/apps/machinelearning-ai/ml-dotnet, Retrieved On: Jun. 14, 2019, 5 Pages.

"Open Neural Network Exchange", Retrieved From: http://web.archive.org/web/20190614124954/https://onnx.ai/, Retrieved On: Jun. 14, 2019, 4 Pages.

"Oracle Autonomous Database", Retrieved From: http://web.archive.org/web/20190627100225/https://www.oracle.com/database/autonomous-database.html, Retrieved On: Jun. 27, 2019, 7 Pages.

"PyTorch", Retrieved From: http:/web.archive.org/web/20190608043634/https://pytorch.org/, Retrieved On: Jun. 8, 2019, 3 Pages.

"Serverless Computing—Amazon Web Services", Retrieved From: http://web.archive.org/web/20190624072020/https://aws.amazon.com/serverless/, Retrieved On: Jun. 24, 2019, 15 Pages.

"Welcome to Apache Giraph!", Retrieved From: http://web.archive.org/web/20190628021745/https://giraph.apache.org/, Jan. 14, 2019, 1 Page.

Abadi, et al., "Tensorflow: A System for Large-Scale Machine Learning", In Proceedings of 12th USENIX Symposium on Operating Systems Design and Implementation, Nov. 2, 2016, pp. 265-283.

Agarwal, et al., "Re-optimizing Data-parallel Computing", In Proceedings of 9th Symposium on Networked Systems Design and Implementation, Apr. 25, 2012, 14 Pages.

Agrawal, et al., "Automated Selection of Materialized Views and Indexes in SQL Databases", In Proceedings of the 26th International Conference on Very Large Databases, Sep. 10, 2000, 10 Pages.

Akdere, et al., "Learning-based Query Performance Modeling and Prediction", In Proceedings of IEEE 28th International Conference on Data Engineering, Apr. 1, 2012, pp. 390-401.

(56) References Cited

OTHER PUBLICATIONS

Bruno, et al., "AutoAdmin Project at Microsoft Research: Lessons Learned", In Bulletin of the IEEE Computer Society Technical Committee on Data Engineering, vol. 34, Issue 4, Dec. 2011, 8 Pages.

Chaudhuri, et al., "Automating Statistics Management for Query Optimizers", In Proceedings of IEEE Transactions on Knowledge and Data Engineering, vol. 13, Issue 1, Jan. 2001, pp. 7-20.

Chaudhuri, et al., "Self-Tuning Database Systems: A Decade of Progress", In Proceedings of the 33rd International Conference on Very Large Data Bases, Sep. 23, 2007, pp. 3-14.

Chung, et al., "Peering Through the Dark: An Owl's View of Inter-Job Dependencies and Jobs' Impact in Shared Clusters", In Proceedings of International Conference on Management of Data, Jun. 30, 2019, 4 Pages.

Ding, et al., "AI Meets AI: Leveraging Query Executions to Improve Index Recommendations", In Proceedings of the 2019 International Conference on Management of Data, Jun. 30, 2019, pp. 1241-1258.

Ding, et al., "Plan Stitch: Harnessing the Best of Many Plans", In Proceedings of the VLDB Endowment, vol. 11, Issue 10, Jun. 2018, pp. 1123-1136.

Dutt, et al., "Selectivity Estimation for Range Predicates Using Lightweight Models", In Proceedings of the VLDB Endowment, vol. 12, Issue 9, May 1, 2019, pp. 1044-1057.

Floratou, et al., "Dhalion: Self-regulating Stream Processing in Heron", In Proceedings of the VLDB Endowment, vol. 10, Issue 12, Aug. 1, 2017, pp. 1825-1836.

Ganapathi, et al., "Predicting Multiple Metrics for Queries: Better Decisions Enabled by Machine Learning", In Proceedings of IEEE 25th International Conference on Data Engineering, Mar. 29, 2009, pp. 592-603.

Graefe, Goetz, "The Cascades Framework for Query Optimization", In Journals of IEEE Data Engineering Bulletin, vol. 18, Sep. 1995, pp. 19-28.

Hu, et al., "VizML: A Machine Learning Approach to Visualization Recommendation", In Proceedings of the CHI Conference on Human Factors in Computing Systems, Paper No. 128, May 4, 2019, 12 Pages.

Jain, et al., "Database-Agnostic Workload Management", In Proceedings of 9th Biennial Conference on Innovative Data Systems Research, Jan. 13, 2019, 9 Pages.

Jalaparti, et al., "Netco: Cache and I/O Management for Analytics over Disaggregated Stores", In Proceedings of the ACM Symposium on Cloud Computing, Oct. 11, 2018, pp. 186-198.

Jindal, "Computation Reuse in Analytics Job Service at Microsoft.", In Proceedings of the International Conference on Management of Data, Jun. 10, 2018, pp. 191-203.

Jindal, et al., "Selecting Subexpressions to Materialize at Datacenter Scale", In Proceedings of the VLDB Endowment, vol. 11, Issue 7, Mar. 2018, pp. 800-812.

Jindal, et al., "Vertexica: Your Relational Friend for Graph Analytics!", In Proceedings of the VLDB Endowment, vol. 7, Issue 13, Aug. 2014, pp. 1669-1672.

Jyothi, et al., "Morpheus: Towards Automated SLOs for Enterprise Clusters", In Proceedings of 12th USENIX Symposium on Operating Systems Design and Implementation, Nov. 2, 2016, pp. 117-134.

Kraska, et al., "The Case for Learned Index Structures", In Proceedings of the International Conference on Management of Data, Jun. 10, 2018, pp. 489-504.

Li, et al., "Robust Estimation of Resource Consumption for SQL Queries Using Statistical Techniques", In Proceedings of the VLDB Endowment, vol. 5, Issue 11, Jul. 2012, pp. 1555-1566.

Liao, Rita, "Huawei Launches AI-Backed Database to Target Enterprise Customers", Retrieved From: https://techcrunch.com/2019/05/14/huawei-cloud-database/, May 15, 2019, 10 Pages.

Lohman, Guy, "Is Query Optimization a "Solved" Problem?", Retrieved From: http://wp.sigmod.org/?p=1075, Apr. 10, 2014, 10 Pages.

Low, et al., "Distributed GraphLab: a Framework for Machine Learning and Data Mining in The Cloud", In Proceedings of the VLDB Endowment, vol. 5, Issue 8, Apr. 2012, pp. 716-727.

Marcus, et al., "Neo: A Learned Query Optimizer", In repository of arXiv, arXiv:1904.03711v1, Apr. 7, 2019, 18 Pages.

Zaharia, et al., "Accelerating the Machine Learning Lifecycle with MLflow", In Bulletin of the IEEE Computer Society Technical Committee on Data Engineering, vol. 41, Issue 4, Dec. 2018, pp. 39-45.

Mavlyutov, et al., "Dependency-Driven Analytics: a Compass for Uncharted Data Oceans", In Proceedings of 8th Biennial Conference on Innovative Data Systems Research, Jan. 8, 2017, 9 Pages.

Microsoft, Azureml Team, "AzureML: Anatomy of a Machine Learning Service", In Proceedings of The 2nd International Conference on Predictive APIs and Apps, Aug. 6, 2015, 13 Pages.

Diamantini, et al., "Workload-driven Database Optimization for Cloud Applications", In Proceedings of the International Conference on High Performance Computing & Simulation, Jul. 17, 2017, pp. 595-602.

"International Search Report and Written Opinion Issued in PCT Application No. PCT/US20/038266", dated Aug. 21, 2020, 13 Pages.

Yoon, et al., "DBSeer: Pain-free Database Administration through Workload Intelligence", In Proceedings of the VLDB Endowment, vol. 8, Issue 12, Aug. 1, 2015, pp. 2036-2039.

* cited by examiner

CLOUD BASED QUERY WORKLOAD OPTIMIZATION

BACKGROUND

With the growth of the Internet and cloud based services, more and more companies are moving their data to cloud based platforms. Cloud computing is changing the way users interact with databases. In a typical cloud-based data service, a large number of databases may co-exist on the same cloud-based server. In such an environment, a number of different types of databases may co-exist and they each may receive different types of query workloads. Database administrators (DBAs) were traditionally responsible for optimizing the on-premise database workloads. However, with the rise of cloud data services where cloud providers offer fully managed data processing capabilities, the role of a DBA is completely missing.

SUMMARY

Implementations described herein disclose a system for optimizing cloud-based query workloads. In one implementation, the cloud-based query workloads optimization system receives query logs from various query engines to a cloud data service, extracts various query entities from the query logs, parses query entities to generate a set of common workload features, generates intermediate representations of the query workloads, wherein the intermediate representations are agnostic to the language of the plurality of the queries, identifies a plurality of workload patterns based on the intermediate representations of the query workloads, categorizes the workloads in one or more workload type categories based on the workload patterns and the workload features, and selects an optimization scheme based on the category of workload pattern.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Database administrators (DBAs) were traditionally responsible for optimizing the on-premise database workloads. However, with the rise of cloud data services where cloud providers offer fully managed data processing capabilities, the role of a DBA is missing. At the same time, workload optimization becomes even more important for reducing the total costs of operation and making data processing economically viable in the cloud. The technology disclosed herein provides workload optimization in the context of these emerging cloud-based data services. Specifically, the workload optimization platform for cloud query engines disclosed herein includes representing query workloads that in a manner that is agnostic to the query engine and is general enough to describe a large variety of workloads, categorizing the workload patterns, optimizing the corresponding workloads in each category, and provides for adding workload-awareness to a query engines, via the notion of query annotations that are served to the query engine at compile time.

The technology disclosed herein solves a technical solution of database management and optimization that is necessitated by technology problem involving cloud-based databases. Cloud-based databases provide data services to a large number of clients where a various database structures that are different from each other may be used. In such environment, it is difficult for optimizing the query workloads due to differences in query languages, query plans, and database structures. The technology disclosed herein provides for generating database agnostic query representation, which allows to optimize the query workload and then provide feedback to developers and users of the cloud-based databases.

While various implementations disclosed herein are implemented for optimizing the query workloads to cloud-based databases and to provide workload-awareness to a query engines for queries to the cloud-based databases, these implementations can also provide optimization to private data centers supporting a large number of queries from a number of different query engines. For example, such private data centers may be implemented on a single server, a collection of servers, a private cloud, or a public cloud.

Figure 1:
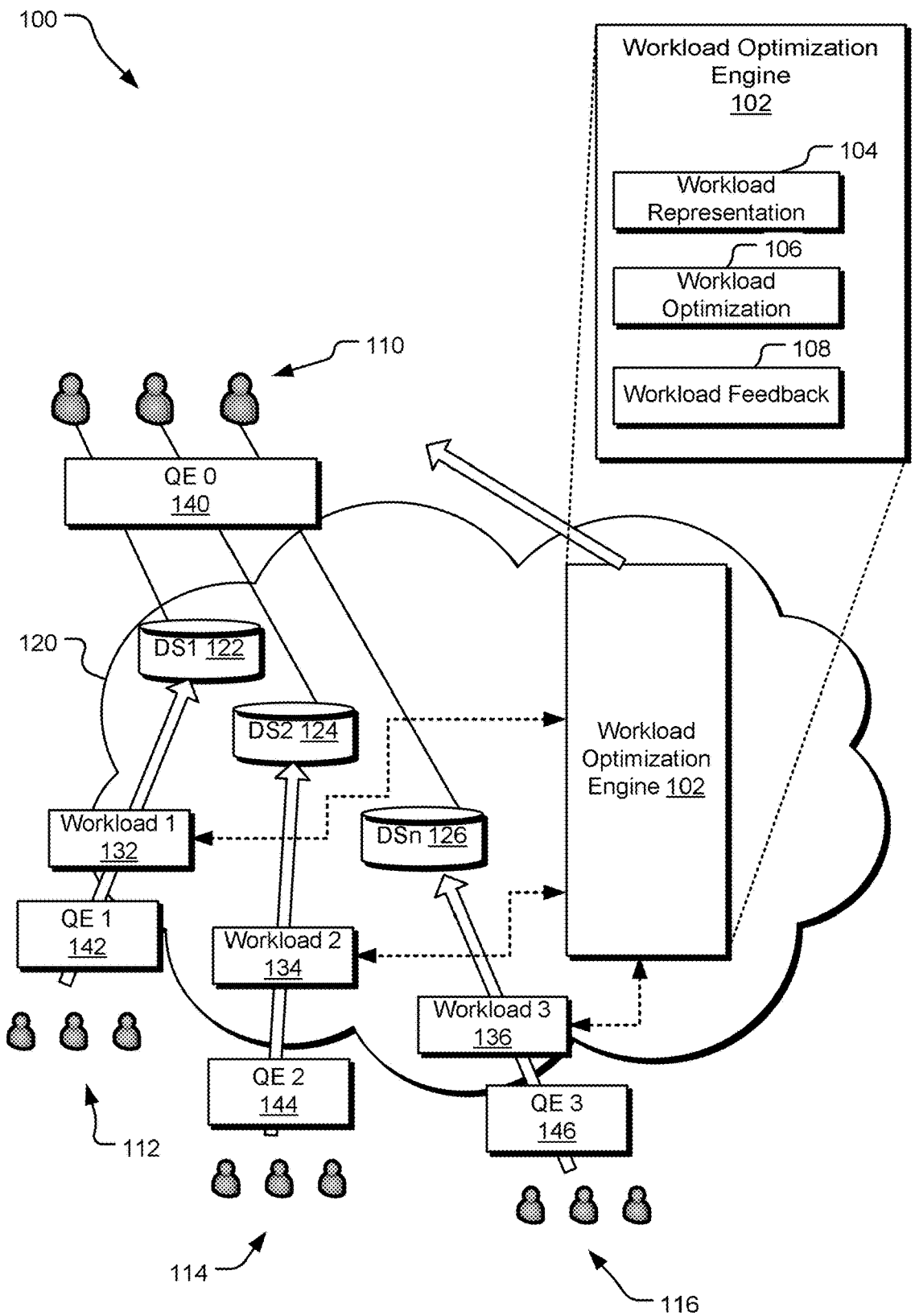
FIG. 1 illustrates an example implementation of a cloud-based query workload optimization system disclosed herein.

FIG. 1 illustrates an example implementation of a cloud-based query workload optimization system 100 disclosed herein. Specifically, the cloud-based query workload optimization system 100 may include a large number of databases DS1 122, DS2 124, . . . , DSn 126 on a cloud-based data server 120. For example, the database DS1 122 may be an SQL database, the database 124 may be a DB2 database, a database DS3 may be a FileMaker database, etc. The data server 120 may serve various developers 110 that manage these individual databases as well as various users 112, 114, 116 that use the databases DS1-DSn.

The data server 120 includes a workload optimization engine 102 that analyzes data query logs for the databases 122-126, generates optimization schemes based on the analysis of the databases, and provides feedback to the developers 110 and the users 112-116 about selected optimization schemes. In one implementation, the workload optimization engine 102 accesses data query logs for the databases 122-124 to analyze the workloads 132-136 for these databases. The workload optimization engine 102 may include a workload representation module 104, a workload optimization module 106, and a workload feedback module 108. The functionalities for each of these modules 104-108 are further described below in FIGS. 2-8.

The workload optimization engine 102 may be implemented using a computing device, such as the computing device disclosed below in FIG. 8, where one or more of the modules and their related operations may be implemented by computer executable instructions that are stored in a computer-readable medium. While in the illustrated implementation, the workload optimization engine 102 is illustrated as being implemented on the cloud-based data server 120, in an alternative implementation, the workload optimization engine 102 may be implemented at a different server that is communicatively connected to the cloud-based data server 120.

The workload representation module 104 takes as input the logs from the query engines 140-146 related to one or more of the databases 122-126 as well as related runtime information from the underlying platforms (job scheduler, job manager, resource manager, storage service). The workload representation module 104 may process these logs and generate one or more intermediate workload representations that are common across workloads 132-136 and query engines 140-146.

These intermediate representations may be input to engine-agnostic optimization algorithms of the workload optimization module 106. The workload optimization module 106 may be configured to mine the query workload for generating various query patterns and run optimization algorithms to tune those query patterns. Such identifying of the patterns and optimizing for them makes workload optimization practical and less open-ended. In one implementation, each of the pattern class may be associated with one or more optimization algorithms.

The workload feedback module 108 collects the output of the workload optimization module 106 and converts them into actionable feedback that could be either consumed by the users 112-116 and developers 110 in the form of insights and recommendations. Alternatively, the workload feedback module 108 may feedback the output of the to the workload optimization module 106 to the query engines 140-146 for self-tuning. Specifically, for self-tuning, the feedback is encoded as query annotations and loaded onto a feedback server.

The workload optimization engine 102 provides an interface using the query logs that can be implemented for different query engines 140-146. In one implementation, the workload optimization engine 102 provides an extensible infrastructure wherein one or more instrumentations, parsers, patterns, optimizations, and feedback can be added based on evolving workloads 132-136. Furthermore, the workload optimization engine 102 may also provide a library of implementations for each of the one or more instrumentations, parsers, patterns, optimizations, which may act as a starting point for covering more scenarios.

Figure 2:
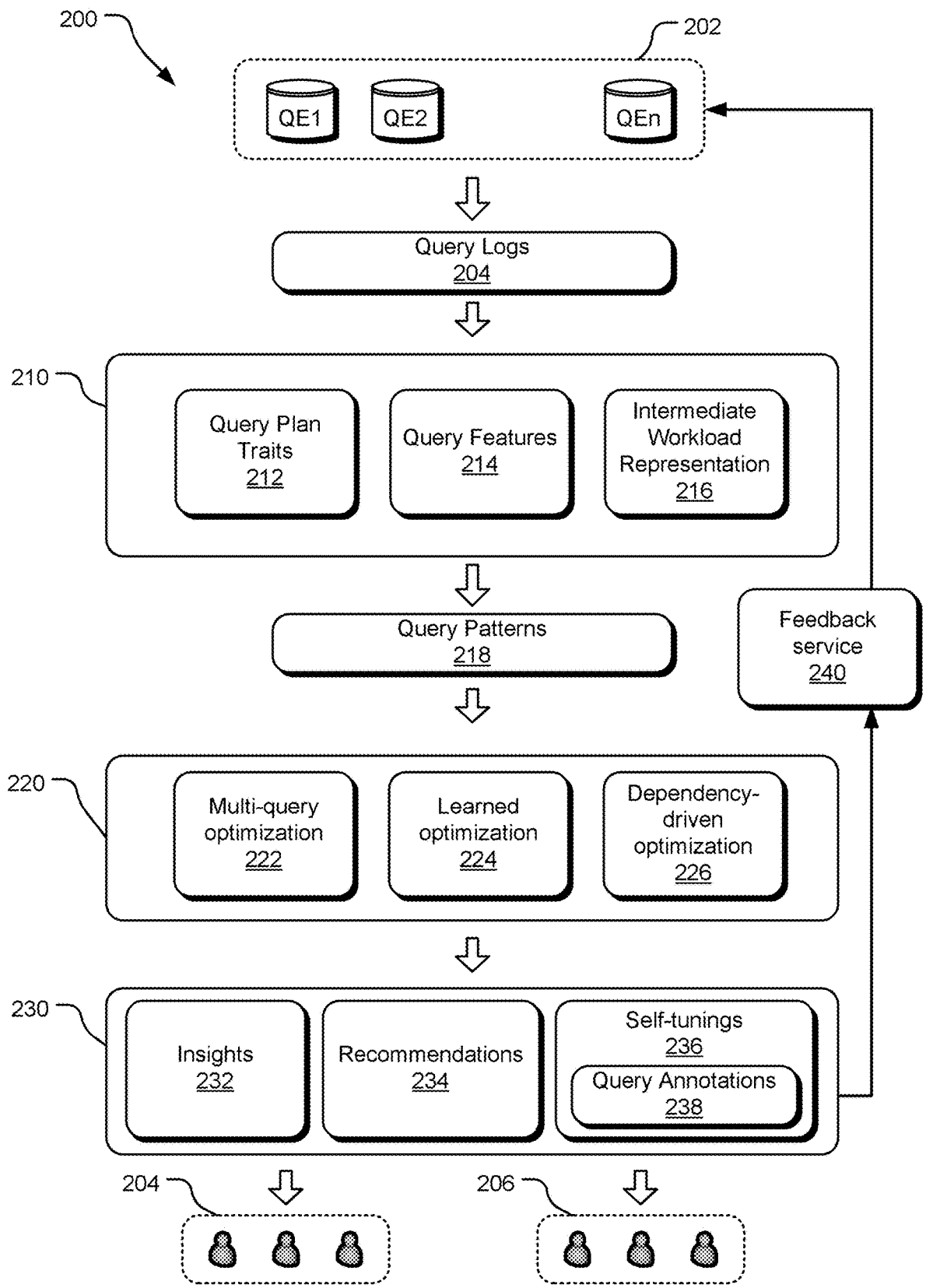
FIG. 2 illustrates an alternative block diagram of a cloud-based query workload optimization system disclosed herein.

FIG. 2 illustrates an alternative block diagram of a cloud-based query workload optimization system 200 disclosed herein. Specifically, the workload optimization system 200 provides one example implementation of the workload optimization engine 102 disclosed in FIG. 1. The workload optimization system 200 may include workload-aware query engines 202 that includes query engines QE1, QE2, . . . , QEn. The query engines 202 may receive queries from various users of cloud-based databases. Various query logs 204 (also referred to as the workload logs 204) from the query engines 202 are fed to a workload representation module 210.

An implementation of the workload representation module 210 provides a mechanism for capturing query plan traits 212 from the query logs 204. In one implementation, the query plan traits 212 may be logged as signatures in the query logs 204. Specifically, the signatures may capture an internal optimizer state, corresponding to different query plan traits, into fixed sized hashes and output the fixed sized hashes as part of the query logs 204. For example, the signatures may be of different types to capture different query plan traits. In one implementation, the signatures may be composed to identify combined traits so that they may be used across multiple query engines QE1-QEn. Table I below illustrates example signatures depending on whether for a given operator, its underlying subgraph, the subgraph parameters, and the subgraph inputs are hashed or not.

TABLE 1

| Signature Type | Operator | Subgraph | Parameters | Inputs |
| --- | --- | --- | --- | --- |
| Strict | √ | √ | √ | √ |
| Recurring | √ | √ | √ | |
| Parametric | √ | √ | | √ |
| Semantic | √ | √ | | |
| Domain | √ | | | √ |
| Class | √ | | | |

In one implementation of the workload representation module 210, an application programming interface (API) may be provided to take a query plan subexpression from a query engine to generate a signature as an output.

The workload representation module 210 also includes a feature store 214 that stores features from query logs 204. Specifically, the workload representation module 210 parses the query logs 204 to generate a common set of features that are stored in the feature store 214. For example, the workload representation module 210 extracts one or more relevant entities from the query logs 204 (examples of such entities are illustrated and discussed below in FIG. 3). Specifically, the information about the query entities may include query metadata, query plans, and runtime statistics—together referred to as the query traces.

Example query metadata may include flags and parameters provided with the query, user and account names, query submit, start, and end times, available resources, etc., including flags and parameters provided with the query, user and account names, query submit, start, and end times, available resources, etc. Example query plans include the logical (input, analyzed, optimized), the physical, and the execution plans for the query. Whereas example runtime statistics may include row counts, latency, CPU time, I/O time, memory usage, etc.

The workload representation module 210 parses the query traces from various query logs 204. In one implementation, a number of parsers may be used with each parser configured to parse query traces from a particular type of query engine, such as a parser for XML queries, a parser for JSON queries, a parser for plain text queries, etc. These parsers output a set of common workload features that are stored in the query feature store 214. In one implementation, the query feature store 214 has an extensible design to add more query engines, extract other pieces of information from the query 204 log, add new parsers for custom query formats, and add newer query workload features as they emerge.

The workload representation module 210 uses the entities in the query feature store 214 to generate intermediate workload representations 216. Specifically, the intermediate workload representations 216 are generalized across various disparate query processors, such that they can be used to run various optimization algorithms. Examples of the intermediate workload representations 216 are discussed in further detail below in FIG. 4.

The intermediate workload representations 216 are analyzed to identify query patterns 218. For example, such query patterns may include a recurring query pattern, a similarity query pattern, a dependency query pattern, etc. Example structures of these query patterns 218 are further illustrated below in FIG. 5. Once the query patterns 218 are identified, a workload optimization module 220 selects an optimization type based on the query patterns 218.

Specifically, if the query pattern 218 is identified as a recurring query pattern, learned optimization algorithms 224 are used to optimize the workload. Similarly, if the query pattern 218 is identified as a similarity query pattern, multi-query optimization algorithms 222 are used to optimize the workload. On the other hand, if the query pattern 218 is identified as a dependency query pattern, one of dependency-driven optimization algorithm 226 is used to optimize the workload.

An example of a learned optimization algorithm 224 includes models that analyze recurring workloads and provide it as feedback to the query engine, such as for example, a neural network. An example of a multi-query optimization algorithm 222 may involve caching data at various layers in the data service so as to serve multiple query engines without having to execute the queries at multiple times. On the other hand, a dependency-driven query optimization algorithm 226 may include computing the relative importance of queries in a data pipeline and scheduling them according to their importance. Another example of a dependency-driven query optimization algorithm 226 may consist of a pipeline of queries that have data dependencies between them, such that the output of a producer query may be used in a subsequent consumer query.

The workload optimization module 220 outputs feedback 230 that can be used for various actions by the users 204 and developers 206. The feedback 230 may include insights 232, recommendations 234, and self-tunings 236. Specifically, the insights 232 may be summaries and reports over the workload intermediate representations to help users understand their workload and take any appropriate tuning actions based on their interpretation. An example of such a summary is a summary over subexpression intermediate representations. On the other hand, the recommendations 234 are outputs of the optimization algorithms that are provided as hints to the users. Users can apply these hints using the tuning knobs provided by the query engines. For example, such hints may include a row count hint, an operator algorithm hint, and forcing a join order hint.

Finally, the self-tunings 236 may include encoding workload optimization decisions into query annotations 238, which are in a format that is extensible to add more optimizations and that may be integrated with multiple query engines. The query annotations 238 provide an interface between the workload optimization feedback and the changes in the query engines to consume that feedback. In one implementation, a query annotation 238 may include a signature, an action, and a set of parameters. Here the signature is a query plan identifier as described above in Table 1. The actions are the names of the self-tunings to be performed by the query engine, such as for example, the configuration to apply, the tuning knob to set, the query optimizer rule to invoke, etc. The parameters provide the information needed for the action, such as for example, the configuration value or the optimizer rule parameter. Note that in some instances, the signature may have several actions, or a given action may be applied to several signatures. Thus, the query annotations 238 specify the self-tuning actions using the parameters and conditioned upon the query plan signatures.

The query annotations 238 are fed back by a feedback service engine 240 to the query engines 202 and they may be consumed by query engines 202 during compilation. In one implementation, the query annotations 238 are output into a file in cloud storage location. In such an implementation, the feedback service engine 240 periodically polls this file for new query annotations 238 and bulk loads any new query annotations 238 to the query engines 202. Alternatively, the feedback service engine 240 provides APIs to lookup the query annotations 238 by their signatures, such that it can return all query annotations 238 for a given signature. Furthermore, each of the query annotations 238 may be associated with a customer account such that a query from a customer account can load only those query annotations 238 that are associated with that customer account. In an alternative implementation, the feedback service engine 240 allows to add tags to the query annotations 238 and to batch lookup all annotations for given tag(s). An example of such a tag may be a recurring job name, such as a periodic job that appears with a similar name each time. For such jobs, the query engine may load all query annotations 238 corresponding to that recurring job name in a single lookup.

An implementation of the feedback service engine 240 provides an index on the signatures and the tags of the query annotations 238 to make the batch lookups faster. Furthermore, the feedback service engine 240 bulk loads the annotations for a customer account, thereby not having to update the indexes incrementally. Because many queries may have common subexpressions and therefore common query annotations 238 as well, in another implementation, the feedback service engine 240 caches the query annotations 238 in an application layer. In another implementation, the feedback service engine 240 expires query annotations 238 when new annotations for the same signatures and the same actions are available, such that the new query annotations 238 over-ride the older query annotations 238.

Providing the query annotations 238 via the feedback service engine 240 makes the query engines 202 workload aware such that they are learning from how things went in the past workloads and taking optimization actions into consideration for future queries. An example implementation of a workload aware query engine is disclosed below in FIG. 8.

Figure 3:
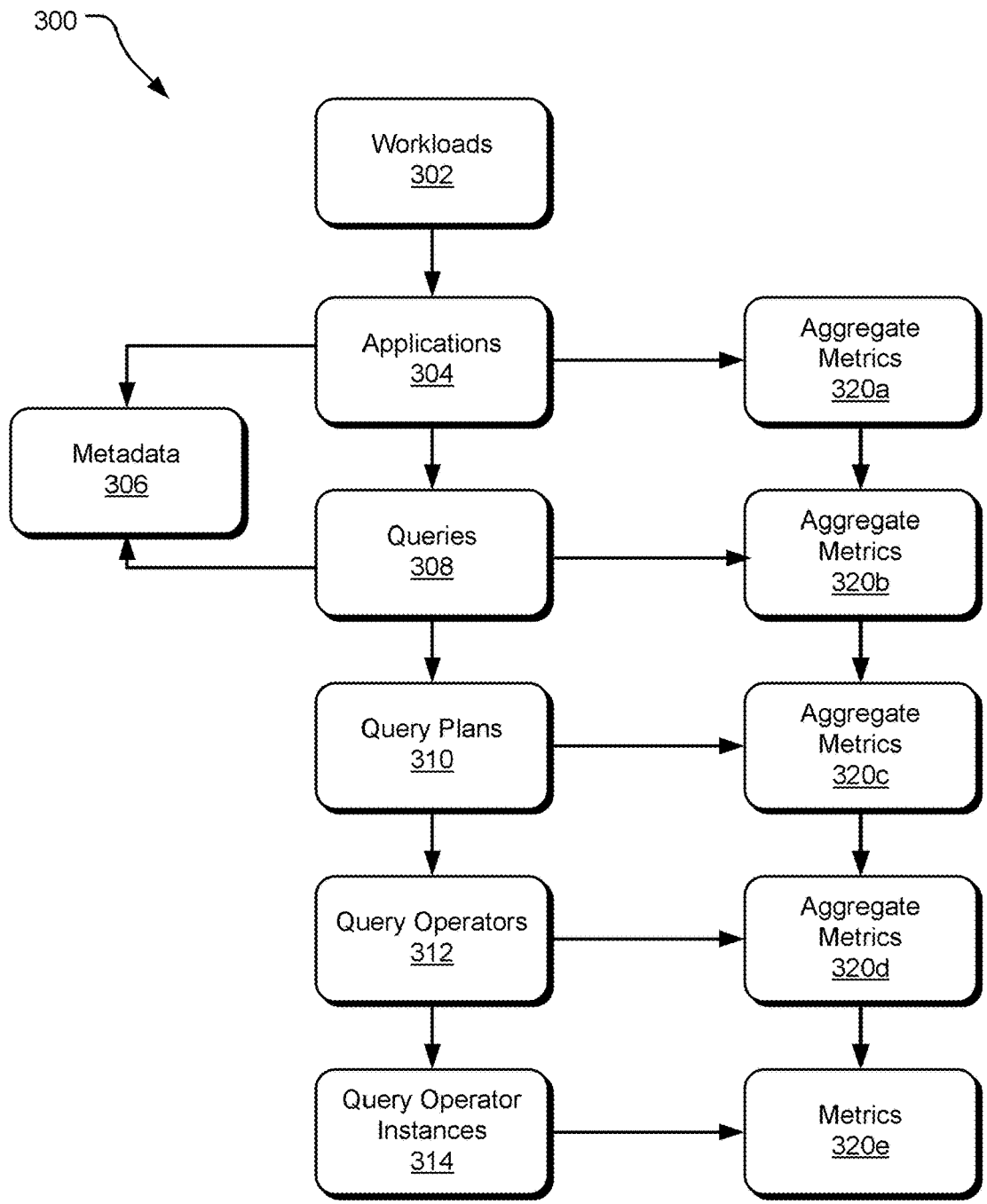
FIG. 3 illustrates example relations of various entities in a data store of the cloud-based query workload optimization system disclosed herein.

FIG. 3 illustrates example entity relations 300 of various entities in a feature store of the cloud-based query workload optimization system disclosed herein. Specifically, the entity relations 300 shows common workload features that are output by a parser that parses query traces from query logs. As illustrated in the entity relations 300, a workload entity 302 is related to applications entity 304. Thus, a workload 302 may be for an application 304, such as an SQL based application, a DB2 based application, etc. The applications 304 are related to queries 308, metadata 306, and aggregate metrics 320 generated from the applications. Each of the applications 304 and the queries 308 may have related metadata 306. The queries 308 are also related to query plans. Furthermore, query plans 310 have query operators 312 and the operators have query operator instances 314.

As shown in FIG. 3, each of the applications 304, the queries 308, the query plans 310, query operators 312, and query operator instances 314 are related to their respective aggregate metrics 320a-320e.

Figure 4:
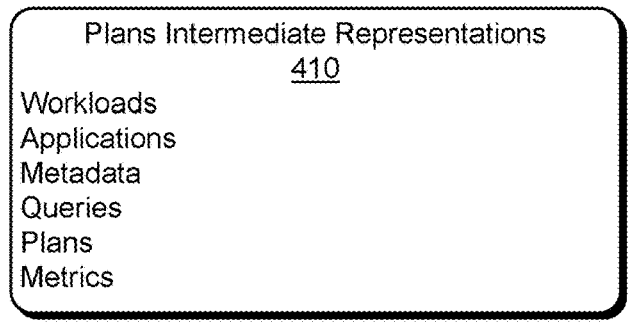
FIG. 4 illustrates example workload intermediate representations for the cloud-based query workload optimization system disclosed herein.
Figure 4:
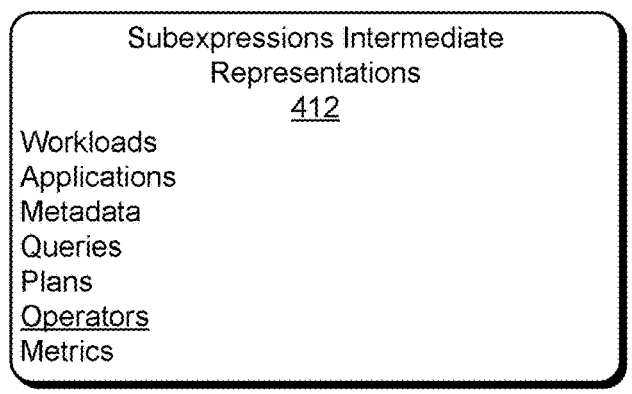
Figure 4:
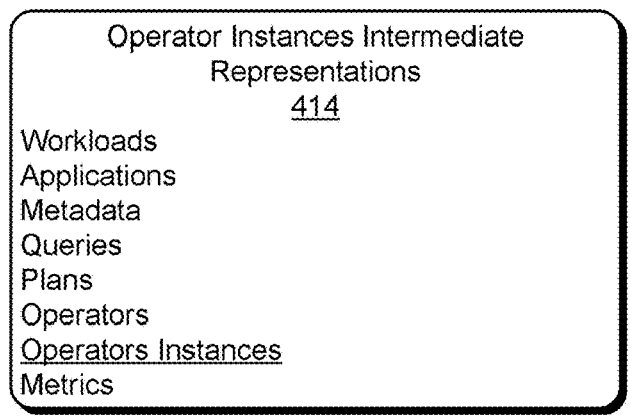

FIG. 4 illustrates example intermediate workload representations 400 for the cloud-based query workload optimization system disclosed herein. Specifically, the intermediate workload representations 400 include plans intermediate representations 410, subexpressions intermediate representations 412, and operator instances intermediate representations 414. Specifically, the intermediate workload representations 400 denormalizes the workload entities (such as the workload entities 300 disclosed in FIG. 3) for more efficient processing by various optimization applications. For example, optimization applications can create and use on or more of these intermediate workload representations 400 depending on the granularity of the information they need. The intermediate workload representations 400 may be stored using the same set of connectors as used for accessing the query logs 204, and may be used for quickly drawing insights and building optimizations for a query workload. Furthermore, the intermediate workload representations 400 may also be shared across multiple workload optimization applications. For example, the subexpressions intermediate representations 412 may be used for finding subexpressions to materialize, learning cardinalities over recurring workloads, mining physical design hints, etc. In one implementation, the intermediate workload representations 400 are generalized across query engines.

Figure 5:
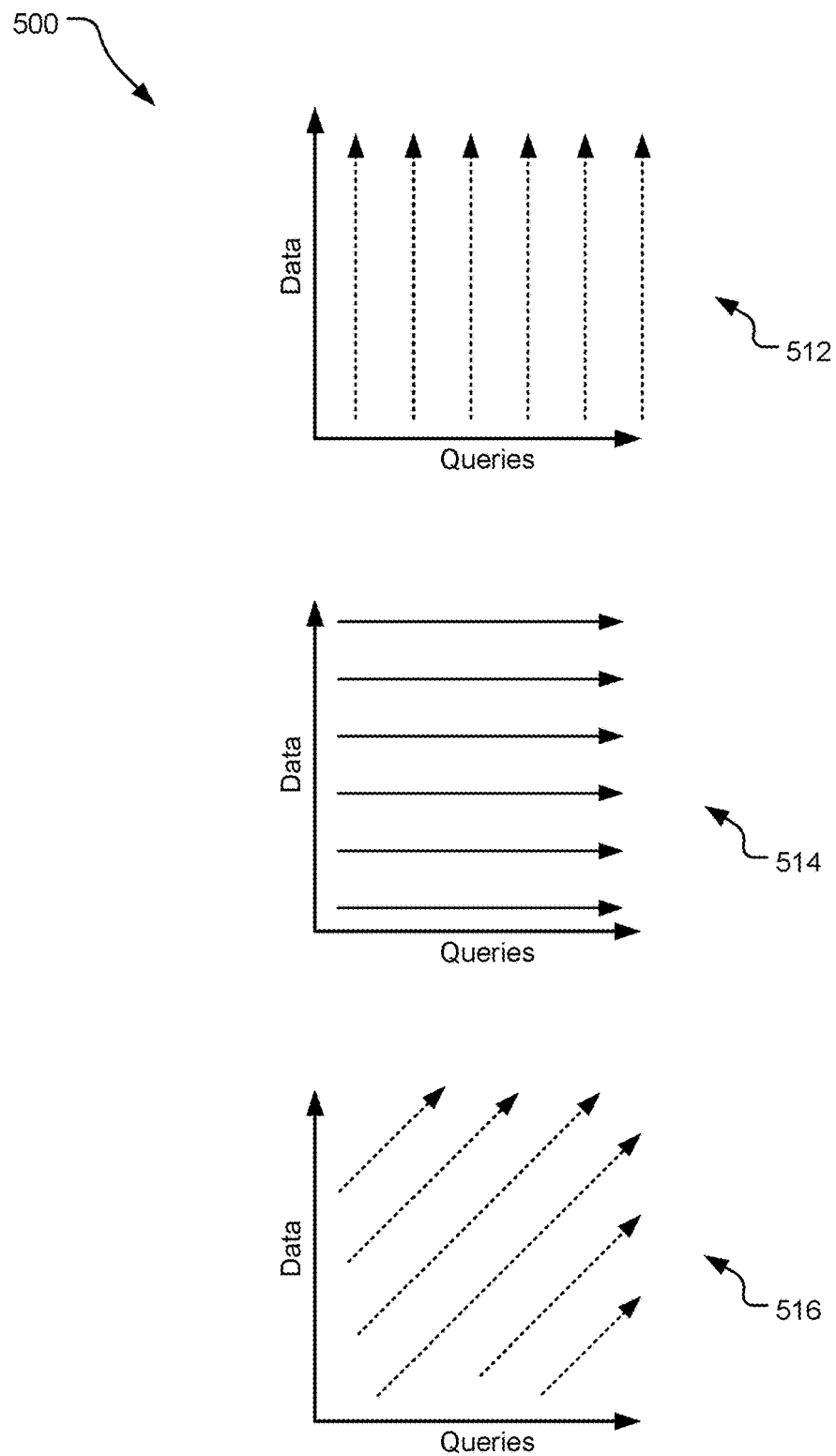
FIG. 5 illustrates example, workload patterns detected by the cloud-based query workload optimization system disclosed herein.

FIG. 5 illustrates example workload patterns 500 detected by the cloud-based query workload optimization system disclosed herein. Specifically, the recurring query pattern 512 represents repetitive query workloads where same queries executed periodically with new inputs and parameters. The recurring query pattern 512 indicates the predictive nature of the workload. On the other hand, the similarity query pattern 514 represent the similarity between queries on the same data. This results when queries are written by multiple users who access the same sets of inputs in the cloud infrastructure. Finally, the dependency query pattern 516 illustrate data pipelines where the output of one query (from the previous recurring interval) is consumed by a subsequent query (in the subsequent recurring interval).

Figure 6:
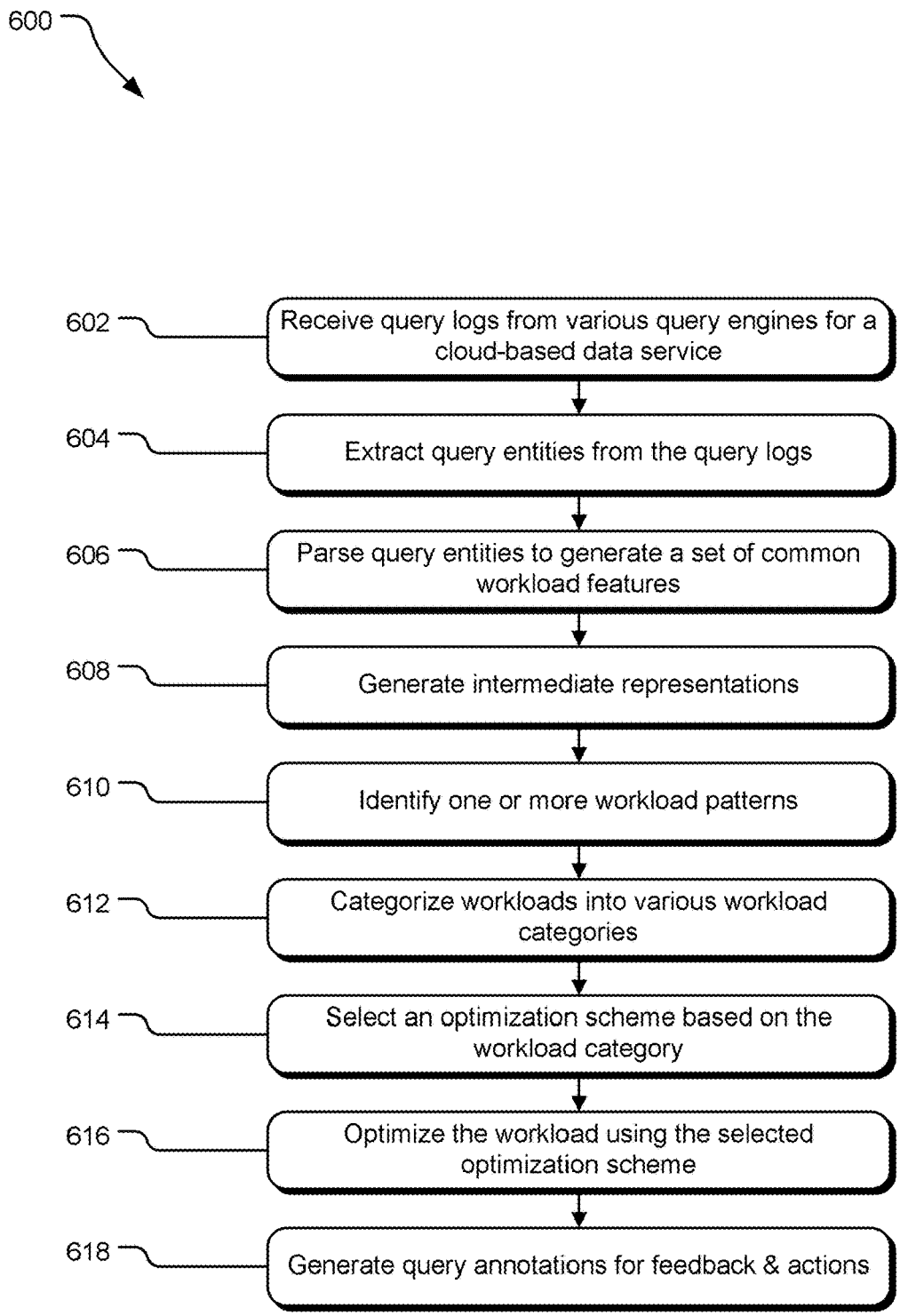
FIG. 6 illustrates example operations of the cloud-based query workload optimization system disclosed herein.

FIG. 6 illustrates example operations 600 of the cloud-based query workload optimization system disclosed herein. An operation 602 receives query logs from various query engines for a cloud-based data service. For example, the cloud-based data service may have databases based on SQL, DB2, etc. And the operation 602 receives queries for one or more of these databases. Query logs are generated over time based on the queries to these databases. Subsequently, an operation 604 extracts query entities from the query logs. Examples of various query entities are discussed in further detail above in FIG. 3.

An operation 606 parses the query entities to generate a set of common workload features along with relationships between these features. The workload features may include, for example, counts and cardinalities for each operator of the query, size of the data returned for the query, etc. An operation 608 generates intermediate workload representations that are agnostic to the query engine and is general enough to describe a large variety of workloads. Specifically, operation 608 generates more efficient workload intermediate representations (IRs), which generalize across query processors, and can be used to run various optimization algorithms on top. Example intermediate workload representations 410-414, which denormalizes the workload entities for more efficient processing, are illustrated above in FIG. 4.

An operation 610 uses the intermediate workload representations to identify one or more workload patterns. Example workload patterns may be a recurring pattern, a similarity pattern, a dependency pattern, etc., as illustrated above in FIG. 5. An operation 612 categorizes workloads in various workload categories based on the workload patterns and based on the categorization, an operation 614 selects an optimization scheme based on the workload category. Thus, for example, a workload categorized to have a recurring pattern may be optimized based on a learned optimization scheme, a workload categorized to have a similarity pattern may be optimized based on a multi-query optimization scheme, and a workload categorized to have a dependency pattern may be optimized based on a dependency-driven optimization scheme. An operation 616 optimizes the workload using the selected optimization scheme. Subsequently, an operation 618 generates query annotations for feedback and actions by users and developers of the cloud-based databases. A feedback engine 240 providing the feedback to various workload-aware query engines is disclosed in further detail above with respect to FIG. 2.

Figure 7:
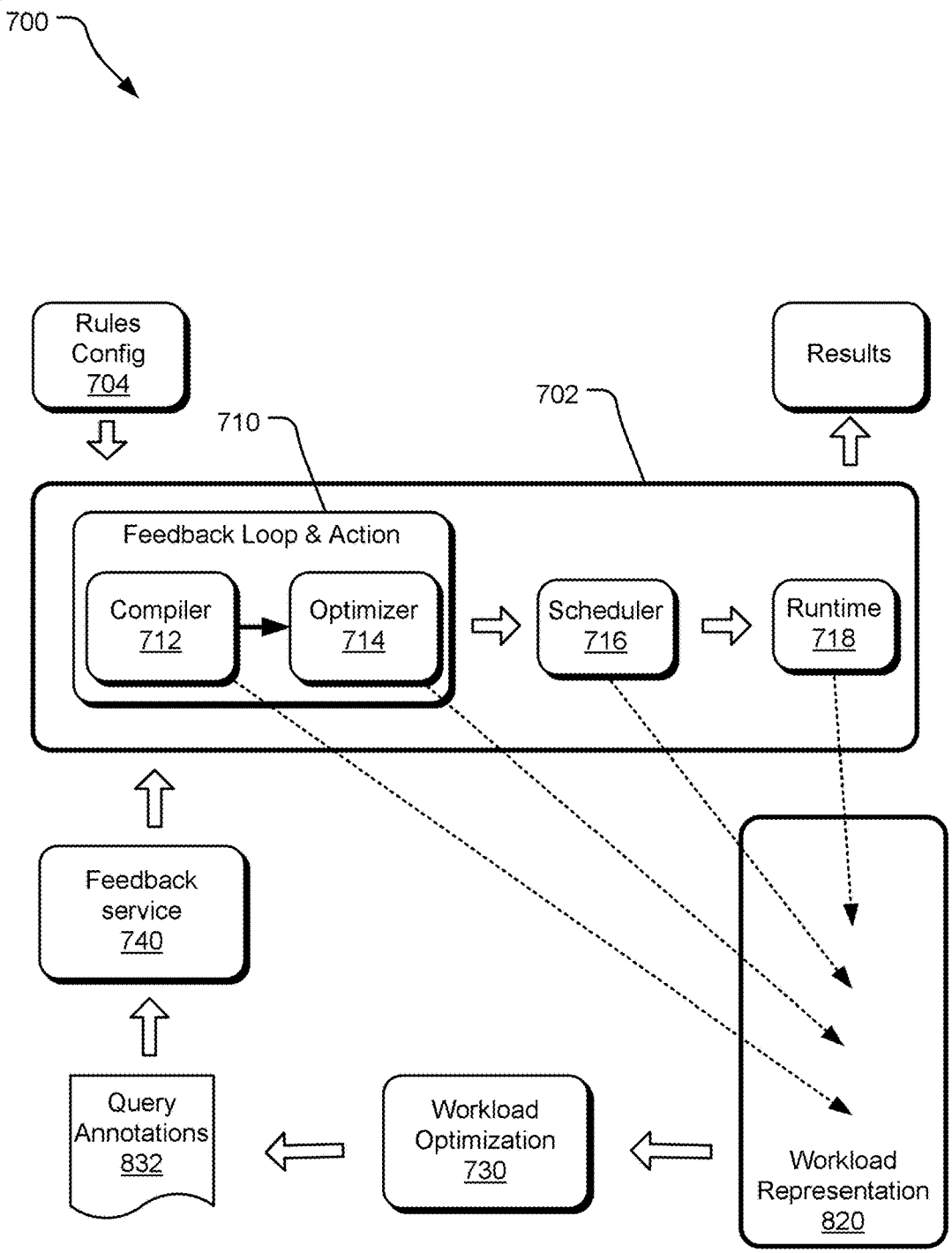
FIG. 7 illustrates alternative example operations of the cloud-based query workload optimization system disclosed herein.

FIG. 7 illustrates an example implementation of a workload aware query engine system 700. A query engine 702 may be configured using various configuration rules 704 for one or more queries from user. The query engine 702 is configured to learn from how things went in the past workloads and taking optimization actions for future queries. In the illustrated implementation, the query engine 702 has mechanisms to load the query annotations feedbacks for the past workloads from a feedback service 740 and the capability to take optimization decisions based on that feedback using an optimizer 714.

Specifically, the feedback service 740 is configured to load query annotations 832 into a feedback loop and action module 710 that includes a compiler 712 and the optimizer 714. In one implementation, the optimizer 714 looks up a query annotation from the query annotations 832 for each signature in the optimizer 714. Alternatively, relevant signatures, using the tags defined in the feedback service 740, are preloaded into the compiler 712. Alternatively, for a smaller self-contained applications, all available signatures are preloaded into the compiler 712 or the optimizer 714 for later use when applicable.

In one implementation, the query annotations 832 are uploaded using an HTTP request to the feedback service 740. Alternatively, a file including the query annotations 832 may be loaded directly to the feedback loop and action module 710 for debugging purpose. Furthermore, developers of the query engine 710 may also create and test new annotation feedback without having to go via the feedback service 740. Optimization decisions may be made at either the compiler 712, at the optimizer 714, at the scheduler 716, or at runtime 718. Therefore, each of these stages may communicate with the workload representation module 820 that stores the workload intermediate representations used by the workload optimization module 730.

Figure 8:
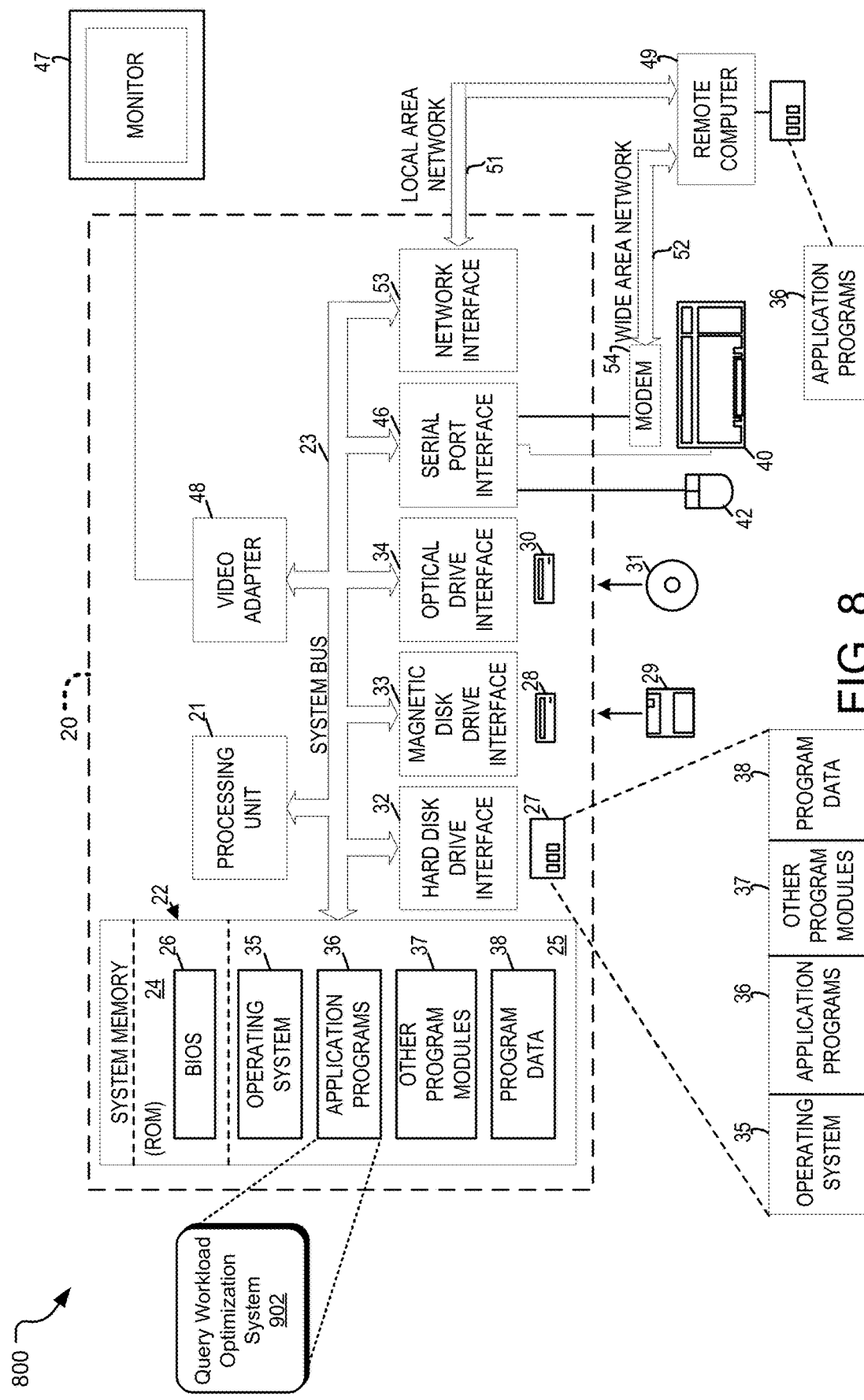
FIG. 8 illustrates an example computing system that may be useful in implementing the described technology.

FIG. 8 illustrates an example system 500 that may be useful in implementing the multi-modality video recognition system disclosed herein. The example hardware and operating environment of FIG. 8 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 8, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing attestable and destructible device identity may be stored in memory 22 and/or storage devices 29 or 31 and processed by the processing unit 21. One or more ML, NLP, or DLP models disclosed herein may be stored in memory 22 and/or storage devices 29 or 31 as persistent datastores. For example, a cloud-based query workload optimization system 802 may be implemented on the computer 20 as an application program 36 (alternatively, the cloud-based query workload optimization system 802 may be implemented on a server or in a cloud environment). The cloud-based query workload optimization system 802 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

A physical article of manufacture disclosed herein includes one or more tangible computer-readable storage media, encoding computer-executable instructions for executing on a computer system a computer process, the computer process includes receiving query logs from various query engines to a cloud data service, extracting various query entities from the query logs, parsing query entities to generate a set of common workload features, generating intermediate representations of the query workloads, wherein the intermediate representations are agnostic to the language of the plurality of the queries, identifying a plurality of workload patterns based on the intermediate representations of the query workloads, categorizing the workloads in one or more workload type categories based on the workload patterns and the workload features, and selecting an optimization scheme based on the category of workload pattern.

In an alternative implementation, the computer process further includes optimizing the workload using the selected optimization scheme. Alternatively, categorizing the workloads further includes categorizing the workloads based on recurring workload pattern, similarity workload pattern, and dependency workload pattern. Alternatively, selecting an optimization scheme based on the category of workload pattern further comprising selecting a dependency-driven optimization scheme if the workload pattern is a dependency pattern. Yet alternatively, selecting an optimization scheme based on the category of workload pattern further comprising selecting a learned optimization scheme if the workload pattern is a recurring pattern.

In an alternative implementation, selecting an optimization scheme based on the category of workload pattern further comprising selecting a multi-query optimization scheme if the workload pattern is a similarity pattern. In another implementation, the computer process further includes generating query annotations that can be used by the query engines during query compilation. Yet alternatively, the query annotations include a signature, an action, and a set of parameters to be consumed by a query compiler. Alternatively, the query annotations are output as a file on a cloud storage location to be accessed by the query engine. In one implementation, the query entities further comprising query metadata, query plans, runtime statistics.

A method of providing cloud-based query workload optimization includes receiving query logs from various query engines to a cloud data service, extracting various query entities from the query logs, parsing query entities to generate a set of common workload features, generating intermediate representations of the query workloads, wherein the intermediate representations are agnostic to the language of the plurality of the queries, identifying a plurality of workload patterns based on the intermediate representations of the query workloads, categorizing the workloads in one or more workload type categories based on the workload patterns and the workload features, and selecting an optimization scheme based on the category of workload pattern.

In one implementation, the method further includes optimizing the workload using the selected optimization scheme. In an alternative implementation, categorizing the workloads further comprising categorizing the workloads based on recurring workload pattern, similarity workload pattern, and dependency workload pattern. An alternative implementation further includes selecting a dependency-driven optimization scheme if the workload pattern is a dependency pattern, selecting a learned optimization scheme if the workload pattern is a recurring pattern, and selecting a multi-query optimization scheme if the workload pattern is a similarity pattern. An alternative implementation further includes generating query annotations that can be used by the query engines during query compilation. In another implementation the query annotations include a signature, an action, and a set of parameters to be consumed by a query compiler. Alternatively, the query annotations are output as a file on a cloud storage location to be accessed by the query engine.

An implementation disclosed herein includes a system implemented in a computing environment, wherein the system includes a memory, one or more processing units, and a cloud-based query workload optimization system stored in the memory and executable by the one or more processor units, the cloud-based query workload optimization system encoding computer-executable instructions on the memory for executing on the one or more processor units a computer process, the computer process including receiving query logs from various query engines to a cloud data service, extracting various query entities from the query logs, parsing query entities to generate a set of common workload features, generating intermediate representations of the query workloads, wherein the intermediate representations are agnostic to the language of the plurality of the queries, identifying a plurality of workload patterns based on the intermediate representations of the query workloads, categorizing the workloads in one or more workload type categories based on the workload patterns and the workload features, selecting an optimization scheme based on the category of workload pattern, and optimizing the workload using the selected optimization scheme. In one implementation, categorizing the workloads further comprising categorizing the workloads based on recurring workload pattern, similarity workload pattern, and dependency workload pattern. In another implementation, the computer process further includes selecting a dependency-driven optimization scheme if the workload pattern is a dependency pattern, selecting a learned optimization scheme if the workload pattern is a recurring pattern, and selecting a multi-query optimization scheme if the workload pattern is a similarity pattern.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A physical article of manufacture including one or more non-transitory computer-readable storage media, encoding computer-executable instructions for executing on a computer system a computer process, the computer process comprising:
receiving query logs from various query engines to a cloud data service;
extracting various query traces from the query logs, wherein the query traces including at least one of query metadata, query plans, and query runtime statistics;
parsing query traces using a plurality of parsers with each of the plurality of parsers configured to parse a different types of queries to generate a set of common workload features;
generating intermediate representations of the query workloads using the set of common workload features, wherein the intermediate representations are agnostic to the language of the plurality of the queries and are common across workloads and query engines;
identifying a plurality of workload patterns based on the intermediate representations of the query workloads;

categorizing the workloads in one or more workload type categories based on the workload patterns and the workload features; and
selecting an optimization scheme based on the category of workload pattern.

2. The physical article of manufacture of claim 1, wherein the computer process further comprising optimizing the workload using the selected optimization scheme.

3. The physical article of manufacture of claim 1, wherein categorizing the workloads further comprising categorizing the workloads based on recurring workload pattern, similarity workload pattern, and dependency workload pattern.

4. The physical article of manufacture of claim 1, wherein selecting an optimization scheme based on the category of workload pattern further comprising selecting a dependency-driven optimization scheme if the workload pattern is a dependency pattern.

5. The physical article of manufacture of claim 1, wherein selecting an optimization scheme based on the category of workload pattern further comprising selecting a learned optimization scheme if the workload pattern is a recurring pattern.

6. The physical article of manufacture of claim 1, wherein selecting an optimization scheme based on the category of workload pattern further comprising selecting a multi-query optimization scheme if the workload pattern is a similarity pattern.

7. The physical article of manufacture of claim 1, wherein the computer process further comprising generating query annotations that can be used by the query engines during query compilation.

8. The physical article of manufacture of claim 7, wherein the query annotations include a signature, an action, and a set of parameters to be consumed by a query compiler.

9. The physical article of manufacture of claim 7, wherein the query annotations are output as a file on a cloud storage location to be accessed by the query engine.

10. The physical article of manufacture of claim 1, wherein the query traces further comprising query metadata, query plans, and query runtime statistics.

11. A method of providing cloud-based query workload optimization, the method comprising:
receiving query logs from various query engines to a cloud data service;
extracting various query traces from the query logs, wherein the query traces including at least one of query metadata, query plans, and query runtime statistics;
parsing query traces using a plurality of parsers with each of the plurality of parsers configured to parse a different types of queries to generate a set of common workload features;
generating intermediate representations of the query workloads using the set of common workload features, wherein the intermediate representations are agnostic to the language of the plurality of the queries and are common across workloads and query engines;
identifying a plurality of workload patterns based on the intermediate representations of the query workloads;
categorizing the workloads in one or more workload type categories based on the workload patterns and the workload features; and
selecting an optimization scheme based on the category of workload pattern.

12. The method of claim 11, further comprising optimizing the workload using the selected optimization scheme.

13. The method of claim 11, wherein categorizing the workloads further comprising categorizing the workloads based on recurring workload pattern, similarity workload pattern, and dependency workload pattern.

14. The method of claim 11, further comprising:
selecting a dependency-driven optimization scheme if the workload pattern is a dependency pattern;
selecting a learned optimization scheme if the workload pattern is a recurring pattern; and
selecting a multi-query optimization scheme if the workload pattern is a similarity pattern.

15. The method of claim 11, further comprising generating query annotations that can be used by the query engines during query compilation.

16. The method of claim 15, wherein the query annotations include a signature, an action, and a set of parameters to be consumed by a query compiler.

17. The method of claim 15, wherein the query annotations are output as a file on a cloud storage location to be accessed by the query engine.

18. In a computing environment, a system comprising:
memory;
one or more processor units;
a cloud-based query workload optimization system stored in the memory and executable by the one or more processor units, the cloud-based query workload optimization system encoding computer-executable instructions on the memory for executing on the one or more processor units a computer process, the computer process comprising:
receiving query logs from various query engines to a cloud data service;
extracting various query traces from the query logs, wherein the query traces including at least one of query metadata, query plans, and query runtime statistics;
parsing query traces using a plurality of parsers with each of the plurality of parsers configured to parse a different types of queries to generate a set of common workload features;
generating intermediate representations of the query workloads using the set of common workload features, wherein the intermediate representations are agnostic to the language of the plurality of the queries and are common across workloads and query engines;
identifying a plurality of workload patterns based on the intermediate representations of the query workloads;
categorizing the workloads in one or more workload type categories based on the workload patterns and the workload features;
selecting an optimization scheme based on the category of workload pattern; and
optimizing the workload using the selected optimization scheme.

19. The system of claim 18, wherein categorizing the workloads further comprising categorizing the workloads based on recurring workload pattern, similarity workload pattern, and dependency workload pattern.

20. The system of claim 18, wherein the computer process further comprising:
selecting a dependency-driven optimization scheme if the workload pattern is a dependency pattern;
selecting a learned optimization scheme if the workload pattern is a recurring pattern; and
selecting a multi-query optimization scheme if the workload pattern is a similarity pattern.

* * * * *